US012590563B2

(12) United States Patent
Tsukamoto

(10) Patent No.: US 12,590,563 B2
(45) Date of Patent: Mar. 31, 2026

(54) VEHICLE

(71) Applicant: TOYOTA JIDOSHA KABUSHIKI KAISHA, Toyota (JP)

(72) Inventor: Ryosuke Tsukamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/971,289

(22) Filed: Dec. 6, 2024

(65) Prior Publication Data

US 2025/0270963 A1 Aug. 28, 2025

(30) Foreign Application Priority Data

Feb. 22, 2024 (JP) ................................. 2024-025742

(51) Int. Cl.
| | |
|---|---|
| *F02D 28/00* | (2006.01) |
| *B60W 10/06* | (2006.01) |
| *B60W 10/30* | (2006.01) |
| *B60W 50/14* | (2020.01) |
| *G07C 5/08* | (2006.01) |

(52) U.S. Cl.
CPC ............. *F02D 28/00* (2013.01); *B60W 10/06* (2013.01); *B60W 10/30* (2013.01); *B60W 50/14* (2013.01); *G07C 5/0825* (2013.01); *B60W 2710/065* (2013.01); *B60W 2710/30* (2013.01)

(58) Field of Classification Search
CPC ...... B60W 50/14; B60W 10/30; B60W 10/06; F02D 28/00
See application file for complete search history.

(56) References Cited

U.S. PATENT DOCUMENTS

| | | | | |
|---|---|---|---|---|
| 4,811,255 A | * | 3/1989 | Kelly, III ................ | G01P 11/00 |
| | | | | 324/164 |
| 2017/0268961 A1 | * | 9/2017 | Teratani ................ | B60W 30/19 |
| 2020/0165987 A1 | * | 5/2020 | Cunningham ........ | B60W 20/00 |

FOREIGN PATENT DOCUMENTS

JP H11-141369 A 5/1999

* cited by examiner

*Primary Examiner* — Kevin A Lathers
(74) *Attorney, Agent, or Firm* — SoraIP, Inc.

(57) ABSTRACT

A vehicle includes: an engine; auxiliary equipment that is driven by the engine; a display device; and a control device. The control device includes: an engine control unit that controls the engine in such a manner that an actual idle speed of the engine in an idle state becomes a target idle speed that changes with a load of the auxiliary equipment on the engine; an acquisition unit that acquires the actual idle speed; a change determination unit that determines whether an accelerator operation amount is zero and the target idle speed is changing; a calculation unit that calculates a slowly changing idle speed obtained by smoothing the actual idle speed with a predetermined degree of smoothing when a determination of the change determination unit is affirmative; and a display control unit that displays the slowly changing idle speed on the display device.

5 Claims, 4 Drawing Sheets

FIG. 3

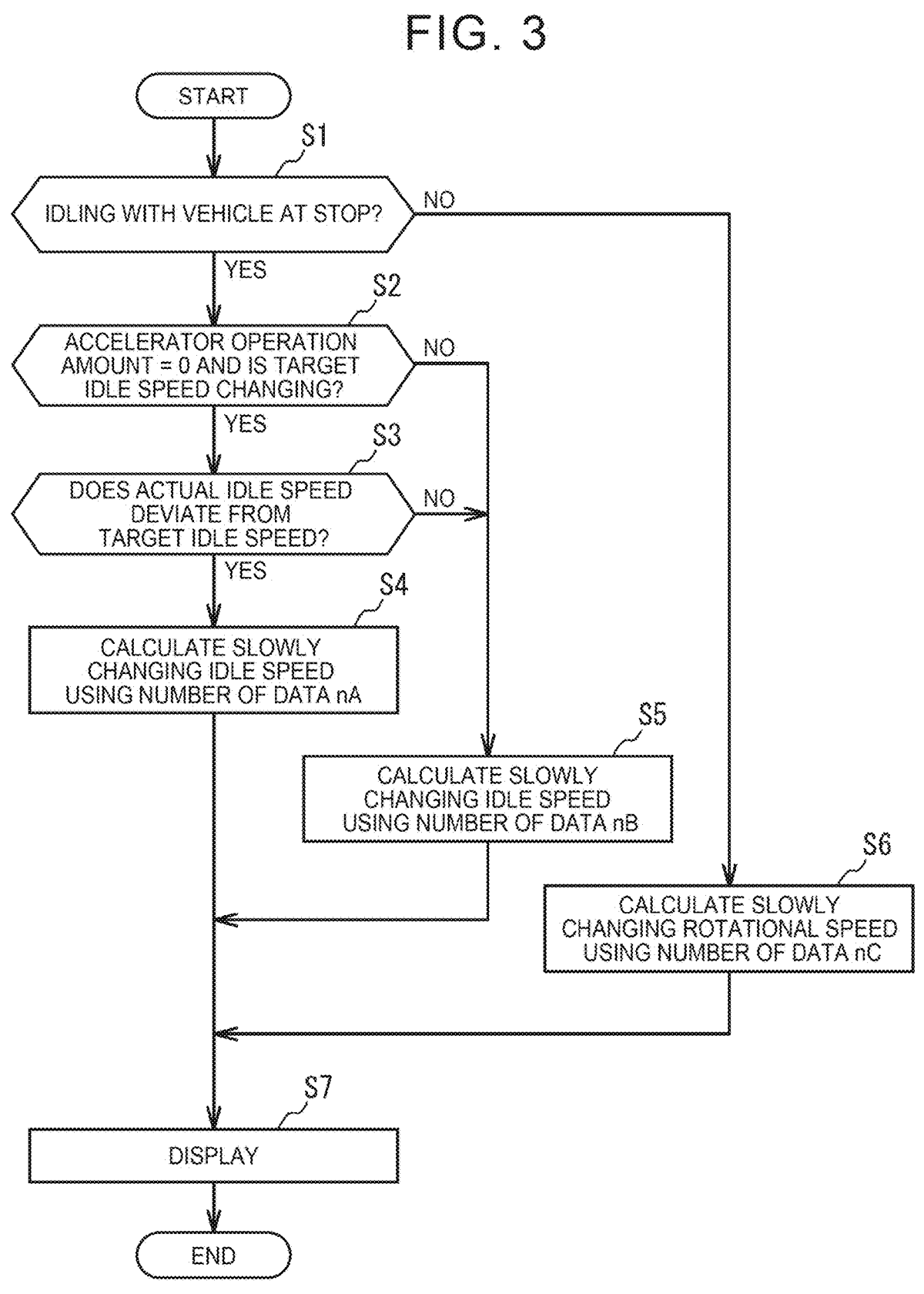

START

S1

IDLING WITH VEHICLE AT STOP?　NO

YES

S2

ACCELERATOR OPERATION AMOUNT = 0 AND IS TARGET IDLE SPEED CHANGING?　NO

YES

S3

DOES ACTUAL IDLE SPEED DEVIATE FROM TARGET IDLE SPEED?　NO

YES

S4

CALCULATE SLOWLY CHANGING IDLE SPEED USING NUMBER OF DATA nA

S5

CALCULATE SLOWLY CHANGING IDLE SPEED USING NUMBER OF DATA nB

S6

CALCULATE SLOWLY CHANGING ROTATIONAL SPEED USING NUMBER OF DATA nC

S7

DISPLAY

END

VEHICLE

CROSS-REFERENCE TO RELATED APPLICATION

This application claims priority to Japanese Patent Application No. 2024-025742 filed on Feb. 22, 2024, incorporated herein by reference in its entirety.

BACKGROUND

1. Technical Field

The present disclosure relates to vehicles.

2. Description of Related Art

It is known that the idle speed of an engine changes with a change in load of auxiliary equipment on the engine (see, for example, Japanese Unexamined Patent Application Publication No. 11-141369 (JP 11-141369 A)).

SUMMARY

For example, when the idle speed indicated by a tachometer changes with a change in load of the auxiliary equipment in a short time in an idle state, the driver may misunderstand that the behavior of the engine in the idle state is unstable.

An object of the present disclosure is to provide a vehicle that avoids a driver misunderstanding that the behavior of an engine in an idle state is unstable.

The above object can be achieved by a vehicle including:

an engine;

auxiliary equipment that is driven by the engine;

a display device; and a control device.

The control device includes an engine control unit that controls the engine in such a manner that an actual idle speed of the engine in an idle state becomes a target idle speed that changes with a load of the auxiliary equipment on the engine, an acquisition unit that acquires the actual idle speed, a change determination unit that determines whether an accelerator operation amount is zero and the target idle speed is changing, a calculation unit that, when a determination of the change determination unit is affirmative, calculates a slowly changing idle speed obtained by smoothing the actual idle speed with a predetermined degree of smoothing, and a display control unit that displays the slowly changing idle speed on the display device.

When the determination of the change determination unit is negative, the calculation unit may calculate the slowly changing idle speed with the degree of smoothing smaller than when the determination of the change determination unit is affirmative.

The vehicle may further include a deviation determination unit that determines whether the actual idle speed deviates from the target idle speed. When either or both of the determination of the change determination unit and a determination of the deviation determination unit are negative, the calculation unit may calculate the slowly changing idle speed with the degree of smoothing smaller than when the determination of the change determination unit and the determination of the deviation determination unit are affirmative.

The calculation unit may calculate a slowly changing rotational speed obtained by smoothing an actual rotational speed of the engine during traveling of the vehicle with a predetermined degree of smoothing.

The degree of smoothing used to calculate the slowly changing rotational speed may be smaller than the degree of smoothing used to calculate the slowly changing idle speed.

The calculation unit may calculate the slowly changing idle speed by dividing a sum of the actual idle speeds of a predetermined number of data detected successively by the number of data, and may reduce the degree of smoothing by reducing the number of data.

The present disclosure can provide a vehicle that avoids a driver misunderstanding that the behavior of an engine in an idle state is unstable.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a flow chart illustrating rotational speed indication control; and

DETAILED DESCRIPTION OF EMBODIMENTS

Schematic Configuration of the Vehicle

Figure 1:
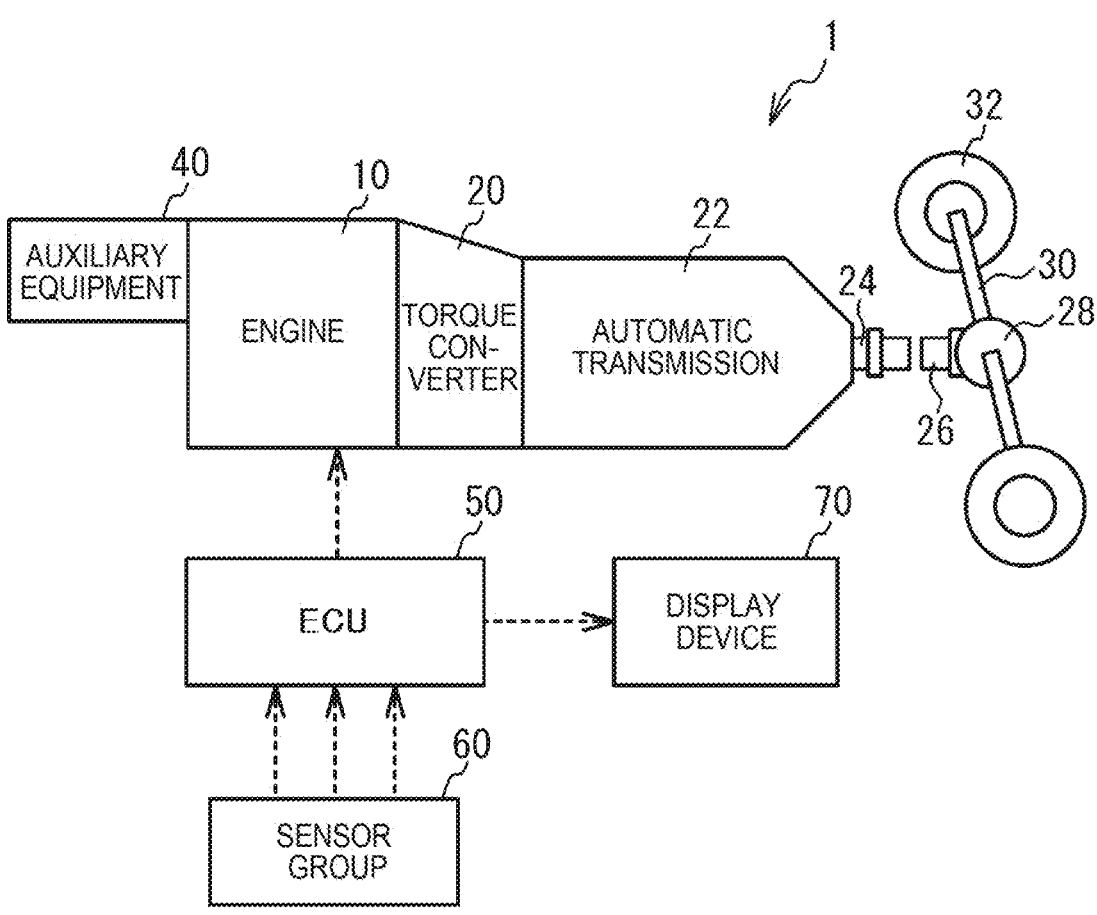
FIG. 1 is a schematic configuration diagram of a vehicle according to the present embodiment.

FIG. 1 is a schematic configuration diagram of a vehicle 1 according to the present embodiment. In FIG. 1, a vehicle 1 includes an engine 10, a torque converter 20, an automatic transmission 22, a propeller shaft 26, an axle 30, drive wheels 32, and auxiliary equipment 40. The vehicle 1 further includes an ECU (Electronic Control Unit) 50, a sensor group 60, and a display device 70. The engine 10 is a driving force source for traveling. The torque converter 20 is a fluid transmission connected to the engine 10. The automatic transmission 22 is connected to the torque converter 20. Power from the engine 10 is transmitted to the automatic transmission 22 via the torque converter 20. The propeller shaft 26 is connected to the output shaft 24 of the automatic transmission 22. The differential gearing 28 is coupled to the propeller shaft 26. The drive wheels 32 are connected to a differential gearing 28 via an axle 30. The auxiliary equipment 40 is driven by the engine 10. The auxiliary equipment 40 is, for example, an air compressor.

ECU 50 is an electronic control unit including an arithmetic processing unit that performs various arithmetic processing related to travel control of the vehicle 1, and a memory in which a control program and data are stored. ECU 50 is an exemplary control device, and the engine control unit, the acquisition unit, the change determination unit, the calculation unit, the display control unit, and the deviation determination unit, which will be described later, are functionally realized.

The sensor group 60 and the display device 70 are electrically connected to ECU 50. The sensor group 60 includes a vehicle speed sensor, a crank angle sensor, and an accelerator operation amount sensor. The vehicle speed sensor detects the vehicle speed of the vehicle 1. The crank angle sensor detects the rotational speed of the engine 10. The accelerator operation amount sensor detects an accelerator operation amount that is an amount of operation of the accelerator pedal. The display device 70 is, for example, a liquid crystal display arranged on a dashboard. The ECU 50 causes the display device 70 to display a tachometer indicating the rotational speed of the engine 10.

The ECU 50 controls the engine 10 so that the actual idle speed of the engine 10 becomes the target idle speed when the engine 10 is in the idle state. Specifically, the ECU 50 controls the fuel injection amount and the empty milk-air amount of the engine 10 so that the actual idle speed becomes the target idle speed. The target idle speed is set to be higher as the load of the auxiliary equipment 40 on the engine 10 is larger. For example, when the auxiliary equipment 40 is an air compressor, the load of the auxiliary equipment 40 on the engine 10 is larger when the air conditioner in the vehicle cabin is on than when the air conditioner is off. Therefore, the target idle speed is set to be higher so that the engine 10 does not stall due to an increase in load of the auxiliary equipment 40. The above processing is an example of the process that is performed by the engine control unit.

Calculation of Slowly Changing Idle Speed

ECU 50 calculates the slowly changing idle speed based on the actual idle speed of the engine 10 in the idle state detected by the crank angle sensor. The slowly changing idle speed is an idle speed calculated by smoothing the actual idle speed with a predetermined degree of smoothing. The slowly changing idle speed changes more slowly than the actual idle speed. As will be described in detail later, the ECU 50 performs rotational speed display control for displaying the slowly changing idle speed on the tachometer of the display device 70.

Figure 2:
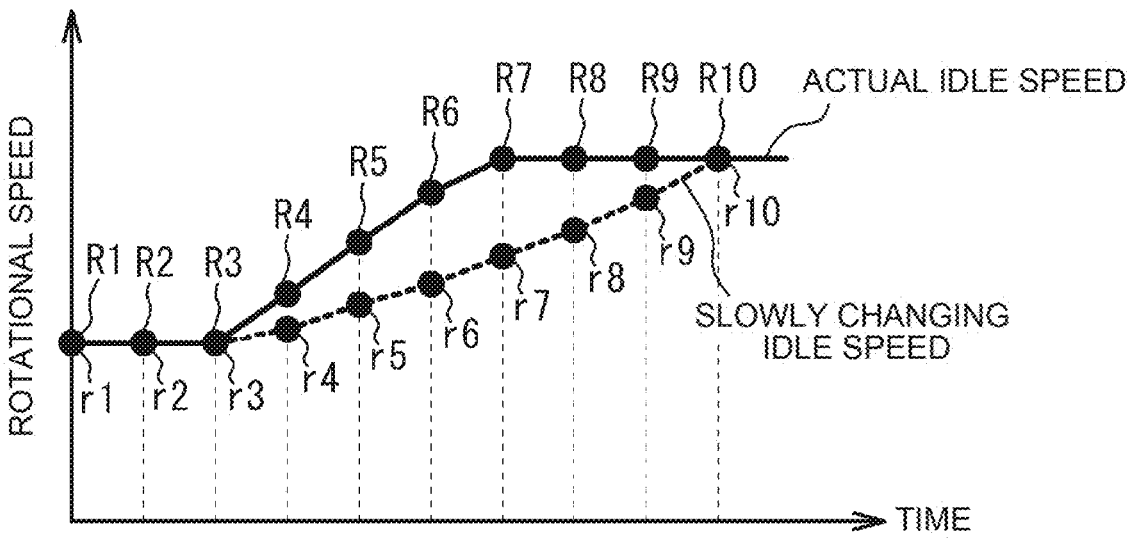
FIG. 2 is a time chart illustrating the actual idle speed and the slowly changing idle speed.

FIG. 2 is a time chart illustrating the actual idle speed and the slowly changing idle speed. FIG. 2 illustrates a case where the actual idle speed detected by the crank angle sensor rises from a constant value and becomes constant again. An example is shown in which the actual idle speed changes in order of R1, R2, . . . and the slowly changing idle speed changes in order of r1, r2, . . . . The slowly changing idle speed changes slower than the actual idle speed.

The slowly changing idle speed is calculated as follows. For example, the sum Tn of the actual idle speeds R1, R2, R3 . . . , Rn of a predetermined number of data n detected successively is calculated. Next, a value obtained by dividing the sum Tn by the number of data n is calculated as the slowly changing idle speed. In other words, the slowly changing idle speed is an average value of the actual idle speeds. For example, the degree of smoothing is adjusted by increasing or decreasing the number of data n used to calculate the slowly changing idle speed. As the number of data n increases, the degree of smoothing increases. That is, as the number of data n increases, the slowly changing idle speed gradually changes with respect to the actual idle speed. The smaller the number of data n, the smaller the degree of smoothing. That is, as the number of data n decreases, the slowly changing idle speed changes so as to approach the actual idle speed. The number of data n is an integer of 2 or more.

The example of FIG. 2 shows the slowly changing idle speed when the number of data n=4. By dividing the sum T1 of the actual idle speeds R1, R2, R3, R4 by 4, the slowly changing idle speed r4 is calculated. Next, the slowly changing idle speed r5 is calculated by dividing the sum T2 of the actual idle speeds R2, R3, R4, R5 by 4. In this way, the slowly changing idle speed is also calculated at the timing when the actual idle speed is detected. In this way, the slowly changing idle speed is calculated by a simple method.

Rotation speed display control

FIG. 3 is a flowchart illustrating the rotation speed display control. First, ECU 50 determines whether the vehicle 1 is at a stop and the engine 10 is in an idle state (S1). If S1 is Yes, ECU 50 determines whether the accelerator operation amount is zero and the target idle speed is changing (S2). When the amount of change per unit time in target idle speed is equal to or larger than the threshold, it is determined that the target idle speed is changing. S2 is an example of the process that is performed by the change determination unit.

If S2 is Yes, ECU 50 acquires the actual idle speed and determines whether the actual idle speed is deviated from the target idle speed (S3). Specifically, when the difference between the actual idle speed and the target idle speed is equal to or larger than the threshold, it is determined that the actual idle speed deviates from the target idle speed. S3 is an example of the process that is performed by the deviation determination unit.

If S3 is Yes, the ECU 50 calculates the slowly changing idle speed using the number of data nA (S4). Thus, even when the load of the auxiliary equipment 40 on the engine 10 changes in the idle state, the slowly changing idle speed indicated by the tachometer changes slowly. This avoids the driver misunderstanding that the behavior of the engine 10 in the idle state is unstable. S4 is an example of the process that is performed by the acquisition unit and the calculation unit.

For No in either S2 or S3, the ECU 50 calculates the slowly changing idle speed using the number of data nB (S5). The number of data nB is smaller than the number of data nA. That is, the degree of smoothing in S5 is smaller than the degree of smoothing in S4. S5 is an example of the process that is performed by the acquisition unit and the calculation unit. For example, when the actual idle speed is increased by depressing the accelerator pedal while the vehicle is at a stop and idling (No in S2), the slowly changing idle speed is calculated with a relatively small degree of smoothing (S5). As a result, the driver can check the rotational speed of the engine 10 indicated by the tachometer and check the responsiveness of the engine 10. Also, when the target idle speed is constant or when the actual idle speed is converging to the target idle speed (No in S2), the slowly changing idle speed is calculated with a relatively small degree of smoothing (S5). This is because the target idle speed and the actual idle speed are stable.

When S1 is No, the vehicle 1 is considered to be traveling, and ECU 50 calculates the slowly changing rotational speed by the number of data nC based on the actual rotational speed of the engine 10 (S6). Here, the number of data nC is smaller than the number of data nB. That is, the degree of smoothing in S6 is smaller than the degree of smoothing in S4 and S5. Therefore, the slowly changing rotational speed calculated in S6 is closer to the actual rotational speed than the slowly changing idle speed calculated in S4 and S5. As a result, the driver can appropriately grasp the change in the rotational speed of the engine 10 in accordance with the change in the accelerator operation amount during traveling.

ECU 50 causes the tachometer of the display device 70 to display the slowly changing idle speed or slowly changing rotational speed calculated as described above (S7). S7 is an example of the process that is performed by the display control unit.

Figure 4:
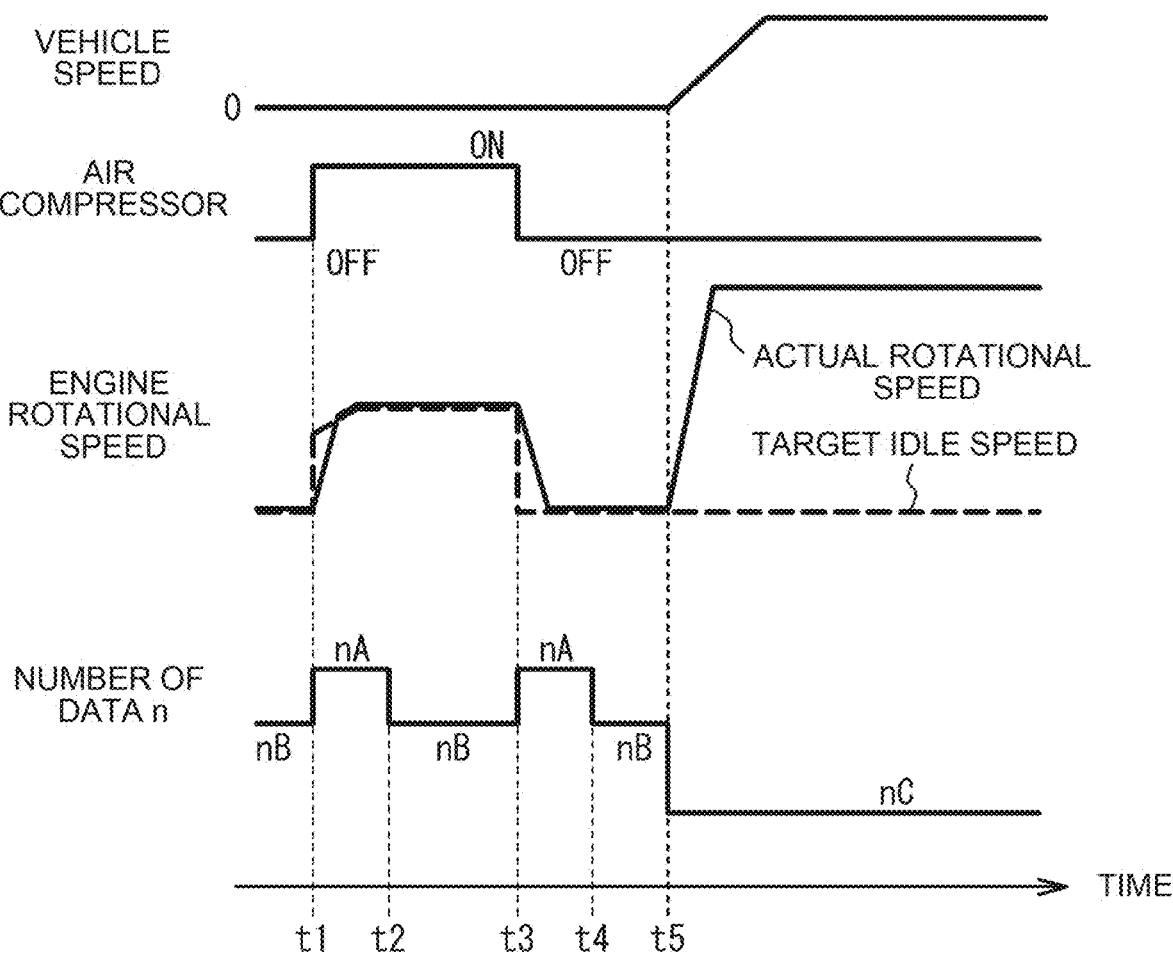
FIG. 4 is a timing chart illustrating the rotation speed display control.

FIG. 4 is a timing chart illustrating the rotation speed display control. FIG. 4 shows the transition of the vehicle speed, the on-off state of the air compressor which is an example of the auxiliary equipment 40, the engine speed, and the number of data n acceleration described above. When the air compressor is turned on while the vehicle speed is 0 (Yes in S1), the target idle speed increases (Yes in S2). Further, the actual rotational speed follows the target idle speed (Yes in S3). Further, the number of data n used to calculate the slowly changing idle speed increases from the number of data nB to the number of data nA (S4, time t1). After that, when the target idle speed becomes constant (No in S2), the number of data n decreases from the number of data nA to the number of data nB (S5, time t2).

After that, when the air compressor is turned off, the target idle speed decreases (Yes in S2), the actual idle speed deviates from the target idle speed (Yes in S3), and the number of data n increases from the number of data nB to the number of data nA (S4, time t3). After that, when the target idle speed becomes constant (No in S2), the number of data n decreases from the number of data nA to the number of data nB (S5, time t4).

When the traveling of the vehicle 1 is started (No in S1), the number of data n is decreased from the number of data nB to the number of data nC (S6, time t5). During traveling, the engine 10 is controlled based on the target torque. Therefore, the target idle speed does not change even during traveling.

The calculation of the slowly changing idle speed may be performed, for example, by multiplying the actual idle speed by a constant coefficient K of less than 1. In this case, the closer the coefficient K is to 1, the more the degree of smoothing decreases.

Although the embodiments of the present disclosure have been described in detail above, the present disclosure is not limited to such specific embodiments, and various modifications and changes can be made within the scope of the gist of the present disclosure described in the claims.

What is claimed is:

1. A vehicle comprising:

an engine;

auxiliary equipment that is driven by the engine;

a display device; and a processor configured to: control the engine in such a manner that an actual idle speed of the engine in an idle state becomes a target idle speed that changes with a load of the auxiliary equipment on the engine, acquire the actual idle speed, determine whether the vehicle is at a stop and the engine is in an idle state, determine whether an accelerator operation amount is zero and whether a rate of change per unit time of the target idle speed is equal to or greater than a predetermined threshold, determine whether the actual idle speed deviates from the target idle speed by at least a predetermined threshold, wherein in response to the determinations that (i) the vehicle is at a stop and the engine is in an idle state, (ii) the accelerator operation amount is zero and the rate of change per unit time of the target idle speed is equal to or greater than the predetermined threshold, (iii) the actual idle speed deviates from the target idle speed by at least the predetermined threshold, the processor calculates a slowly changing idle speed by a moving average obtained by dividing a sum of the actual idle speeds of a first number nA of most-recent successively detected data by the number nA, and causes the display device to display the slowly changing idle speed;

in response to the determinations that (i) the vehicle is at a stop and the engine is in an idle state, (ii) the accelerator operation amount is not zero or the rate of change per unit time of the target idle speed is not equal to or greater than the predetermined threshold, (iii) the actual idle speed does not deviate from the target idle speed by at least the predetermined threshold, the processor calculates the slowly changing idle speed by a moving average using a second number nB of the most-recent successively detected data that is smaller than the first number nA, and causes the display device to display the slowly changing idle speed; and in response to the determinations that the vehicle is traveling, the processor calculates a slowly changing rotational speed by a moving average using a third number nC of the most-recent successively detected data that is smaller than the second number nB, with nC<nB<nA, and causes the display device to display the slowly changing rotational speed.

2. The vehicle of claim 1, wherein the moving average is recalculated at each detection timing at which the actual idle speed is acquired.

3. The vehicle of claim 1, wherein the display device includes a tachometer, and the processor causes the tachometer to display the slowly changing idle speed or the slowly changing rotational speed.

4. The vehicle of claim 1, wherein the auxiliary equipment includes an air-conditioning compressor, and turning ON or OFF the air-conditioning compressor causes step-like changes in the target idle speed.

5. The vehicle of claim 1, wherein the accelerator operation amount is determined to be zero when an accelerator-pedal sensor output indicates a no-depression state.

* * * * *